United States Patent
Goetz et al.

(10) Patent No.: US 10,303,449 B2
(45) Date of Patent: May 28, 2019

(54) COMPILING NON-NATIVE CONSTANTS

(71) Applicant: Oracle International Corporation, Redwood Shores, CA (US)

(72) Inventors: Brian Goetz, Williston, VT (US); Maurizio Cimadamore, Donabate (IE); Vicente A. Romero Zaldivar, Miami, FL (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/908,664

(22) Filed: Feb. 28, 2018

(65) Prior Publication Data
US 2019/0034178 A1    Jan. 31, 2019

Related U.S. Application Data
(60) Provisional application No. 62/539,342, filed on Jul. 31, 2017.

(51) Int. Cl.
*G06F 8/52*    (2018.01)
*G06F 8/41*    (2018.01)

(52) U.S. Cl.
CPC .............. *G06F 8/4441* (2013.01); *G06F 8/41* (2013.01); *G06F 8/443* (2013.01); *G06F 8/52* (2013.01); *G06F 8/4435* (2013.01); *G06F 8/4443* (2013.01)

(58) Field of Classification Search
CPC .............. G06F 8/443; G06F 8/52; G06F 8/41
USPC ......................................... 717/140, 146, 152
See application file for complete search history.

(56) References Cited

U.S. PATENT DOCUMENTS

| | | | | |
|---|---|---|---|---|
| 5,761,511 A * | 6/1998 | Gibbons | ................. | G06F 8/437 717/122 |
| 5,778,231 A * | 7/1998 | Van Hoff | ................. | G06F 8/54 717/143 |
| 7,051,322 B2 * | 5/2006 | Rioux | ................. | G06F 8/427 717/143 |
| 7,185,330 B1 * | 2/2007 | Khu | ................. | G06F 8/4434 717/152 |
| 7,971,194 B1 * | 6/2011 | Gilboa | ................. | G06F 8/10 717/106 |

(Continued)

OTHER PUBLICATIONS
Pop et al., "Integrated Debugging of Modelica Models" (Year: 2014).*

(Continued)

*Primary Examiner* — Phillip H Nguyen
(74) *Attorney, Agent, or Firm* — Invoke

(57) ABSTRACT

Techniques for compiling non-native constants are disclosed. While compiling source code instructions, a compiler determines that a particular source code expression is associated with a command to the compiler to resolve the particular source code expression as a constant during compilation. The compiler is not configured to recognize the particular source code expression as constant without the command signaling to the compiler that the particular source code expression is constant. Based on the command, the compiler executes the particular source code expression to obtain a constant value. The compiler generates compiled instructions based on the source code instructions, in which the constant value is substituted for at least one reference to the particular source code expression.

14 Claims, 9 Drawing Sheets

(56) References Cited

U.S. PATENT DOCUMENTS

| | | | | |
|---|---|---|---|---|
| 8,615,750 B1* | 12/2013 | Narayana Iyer | .... | G06F 11/3624 709/203 |
| 2004/0049763 A1* | 3/2004 | Bloch | .................. | G06F 9/4488 717/116 |
| 2010/0083219 A1* | 4/2010 | Tavares | ................. | G06F 9/4488 717/107 |
| 2010/0088688 A1* | 4/2010 | Edwards | .............. | G06F 8/4442 717/151 |
| 2015/0363174 A1* | 12/2015 | Rose | .................. | G06F 9/44521 717/114 |
| 2016/0246580 A1* | 8/2016 | Das Gupta | .............. | G06F 8/443 |

OTHER PUBLICATIONS

Pioli, "Conditional Pointer Aliasing and Constant Propagation" (Year: 1999).*

* cited by examiner

FIG. 5A
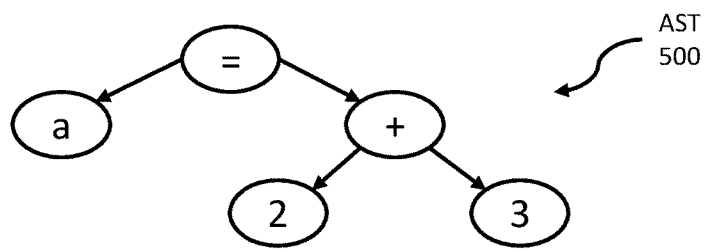
FIG. 5B
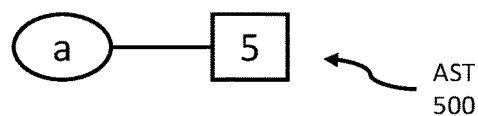
FIG. 5C
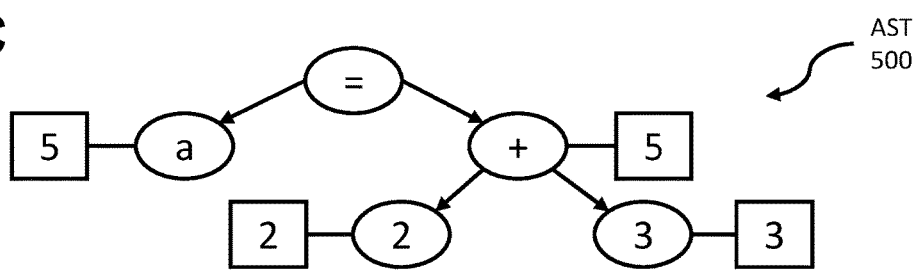
FIG. 5D
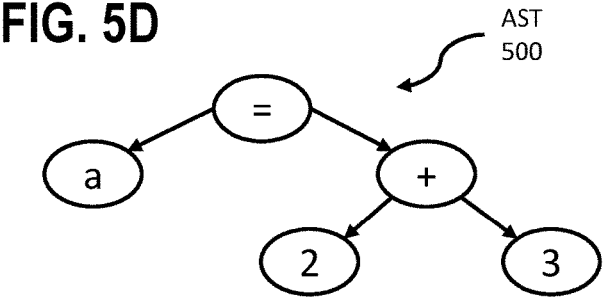
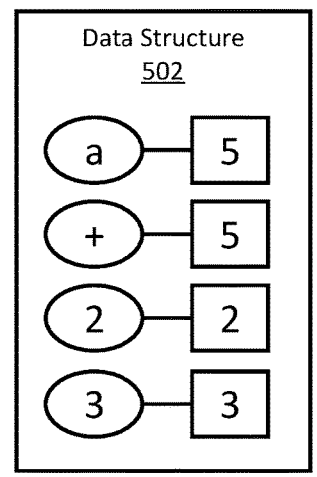

US 10,303,449 B2

COMPILING NON-NATIVE CONSTANTS

BENEFIT CLAIMS; RELATED APPLICATIONS; INCORPORATION BY REFERENCE

This application claims the benefit of U.S. Provisional Patent Application 62/539,342, filed Jul. 31, 2017, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to compilers. In particular, the present disclosure relates to compiler optimizations.

BACKGROUND

A programmer writes source code according to a specification directed to the programmer's convenience. A compiler converts source code to machine or object code, which is executable directly by the particular machine environment. Alternatively or in addition, a compiler converts source code to an intermediate representation ("virtual machine code/instructions"), such as bytecode, which is executable by a virtual machine. A virtual machine is capable of running on top of a variety of particular machine environments.

Constant propagation and folding are compile-time processes that help optimize compiled code and thereby reduce the amount of processing needed at runtime. In constant propagation, the compiler identifies expressions that have constant values and substitutes (or "propagates") the constant values in place of those expressions. As used herein, the term "expression" refers to a source code instruction, or portion thereof, that produces a value. For example, a reference to an initialized variable may be considered an expression. As another example, an arithmetic operation may be considered an expression. Many different types of expressions exist. In constant folding, the compiler identifies an expression that requires evaluation but resolves as a constant, i.e., that returns a constant value given constant input. For example, consider an expression that receives the constant numerical input "3" over a theoretically unlimited number of trials. If the expression always returns the constant string value "three," the expression resolves as a constant. However, if the expression sometimes returns the constant string value "three" and sometimes returns a different value, the expression does not resolve as a constant. For an expression that resolves as a constant, the compiler evaluates the expression to obtain the constant value and replaces the expression with the constant value. After constant folding, it is no longer necessary to evaluate the expression at runtime. The compiler may also propagate the constant value resulting from constant folding, further improving the efficiency of the compiled code. For ease of discussion, as used herein, the term "input" may refer to input passed to a method or function. Alternatively or in addition, the term "input" may refer to an operand in an expression, such as one side of a multiplication expression. In general, the term "input" may refer to any value (or expression that resolves as a value) upon which the resolved value of an expression depends. An expression that returns a constant value given constant inputs may also be referred to as a "pure" function of its inputs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 5A-5D illustrate examples of abstract syntax trees in accordance with one or more embodiments;

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
2.1 EXAMPLE CLASS FILE STRUCTURE
2.2 EXAMPLE VIRTUAL MACHINE ARCHITECTURE
2.3 LOADING, LINKING, AND INITIALIZING
3. CONSTANT PROPAGATION AND CONSTANT FOLDING
4. COMPILING NON-NATIVE CONSTANTS
5. PROPAGATING NON-NATIVE CONSTANTS
6. DYNAMIC METHOD INVOCATION
7. MISCELLANEOUS; EXTENSIONS
8. HARDWARE OVERVIEW
9. COMPUTER NETWORKS AND CLOUD NETWORKS
10. MICROSERVICE APPLICATIONS

1. General Overview

One or more embodiments involve techniques for compiling non-native constants. A non-native constant type is a type that is not built into (i.e., "native" to) the programming language specification. The compiler does not natively recognize non-native constant types as potentially having constant values. While compiling source code instructions, a compiler determines that a particular source code expression is associated with a command to the compiler to resolve the particular source code expression as a constant during compilation. The compiler is not configured to recognize the particular source code expression as constant without the command signaling to the compiler that the particular source code expression is constant. Based on the command, the compiler executes the particular source code expression to obtain a constant value. The compiler generates compiled instructions based on the source code instructions, in which the constant value is substituted for at least one reference to the particular source code expression.

One or more embodiments involve dynamic method invocation. During compilation of source code expressions in a statically typed programming language, a compiler executes a source code expression to generate a constant method handle corresponding to a reference to a method. The compiler executes another source code expression to generate a constant method specifier comprising (a) the constant method handle and (b) a constant argument to be supplied to the method when the method is invoked. The compiler compiles another source code expression for dynamically invoking the method at runtime using the constant method specifier.

One or more embodiments described in this Specification and/or recited in the claims may not be included in this General Overview section.

2. Architectural Overview

Figure 1:
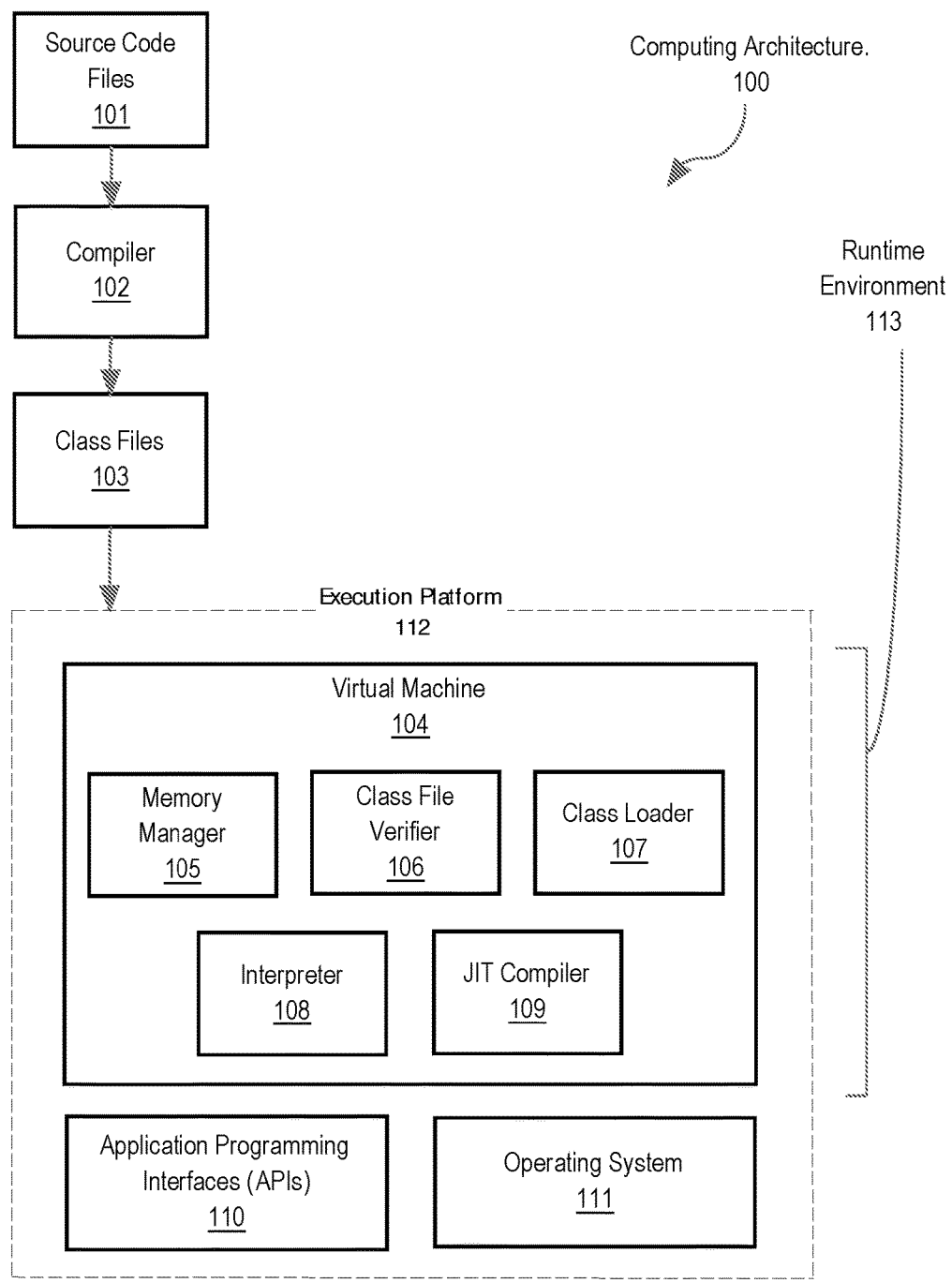
FIG. 1 illustrates an example computing architecture in which techniques described herein may be practiced.

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
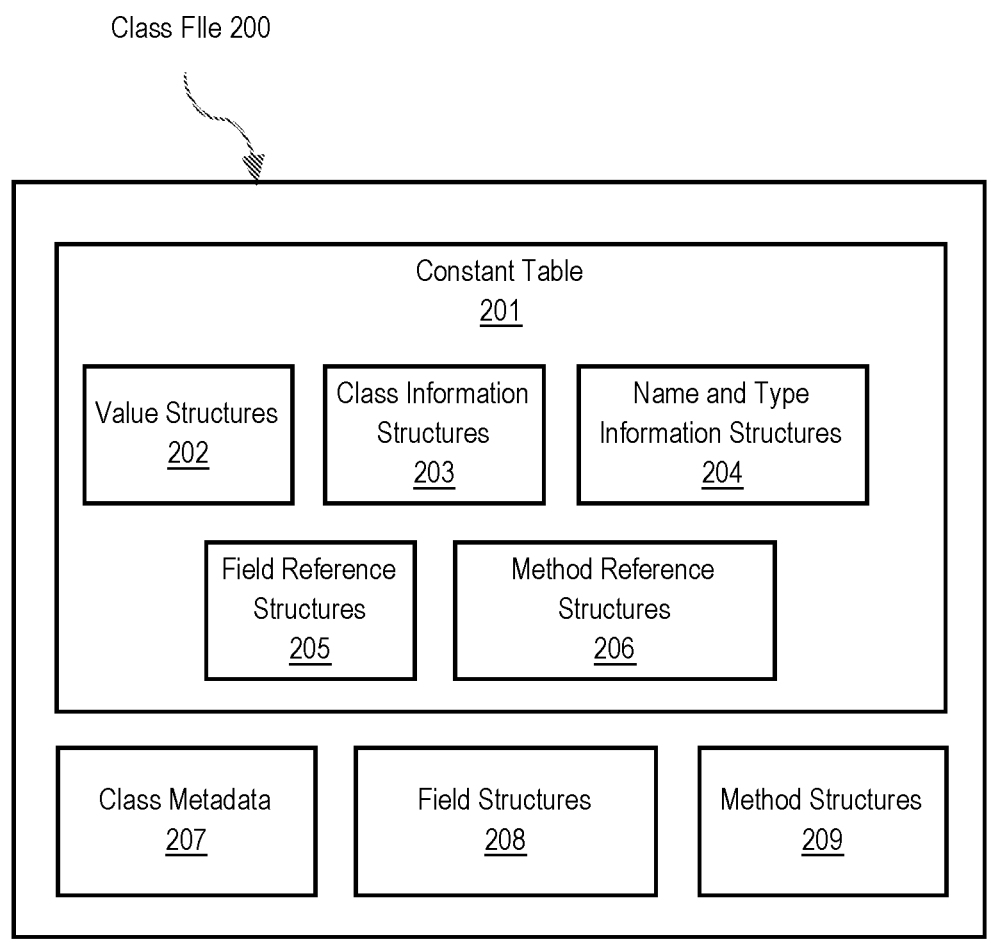
FIG. 2 is a block diagram illustrating an embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
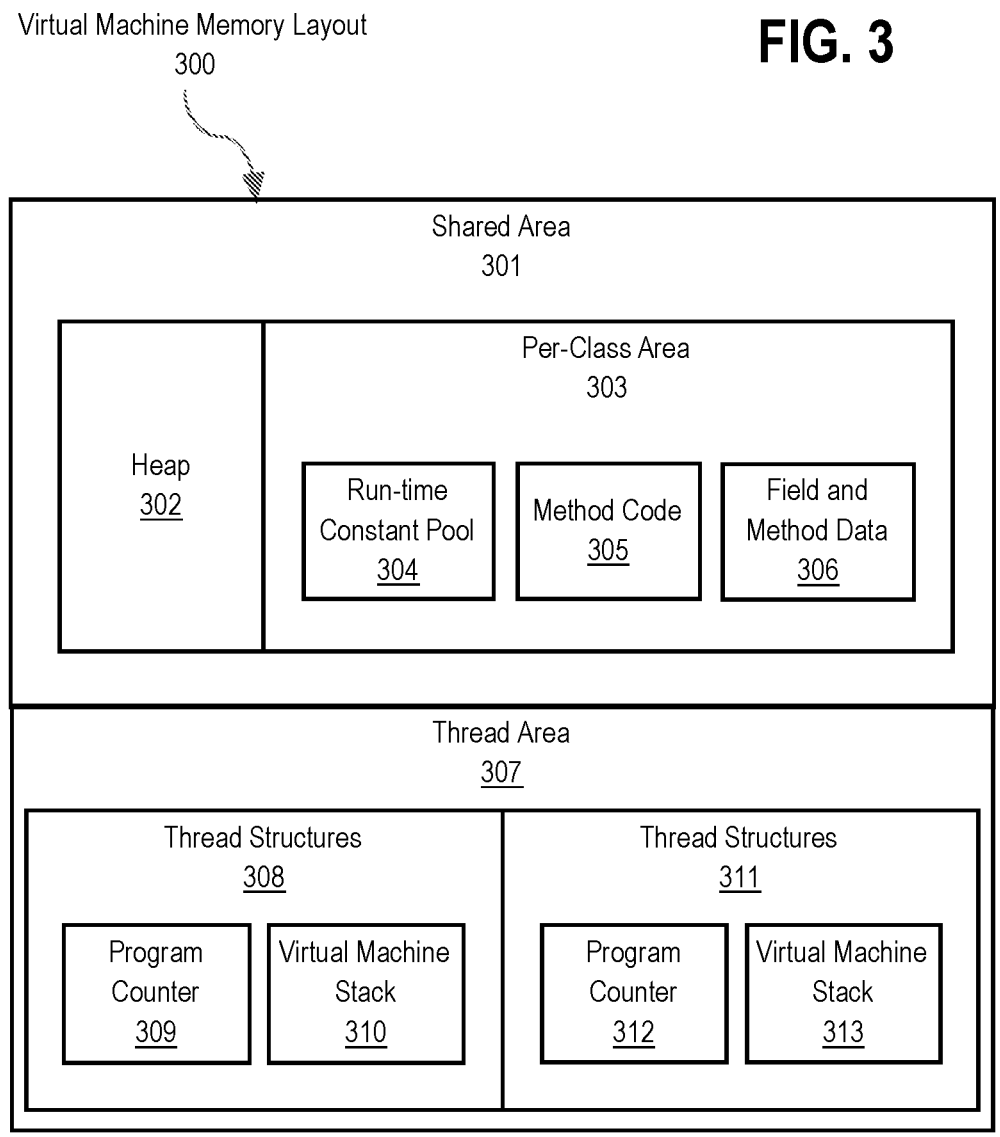
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
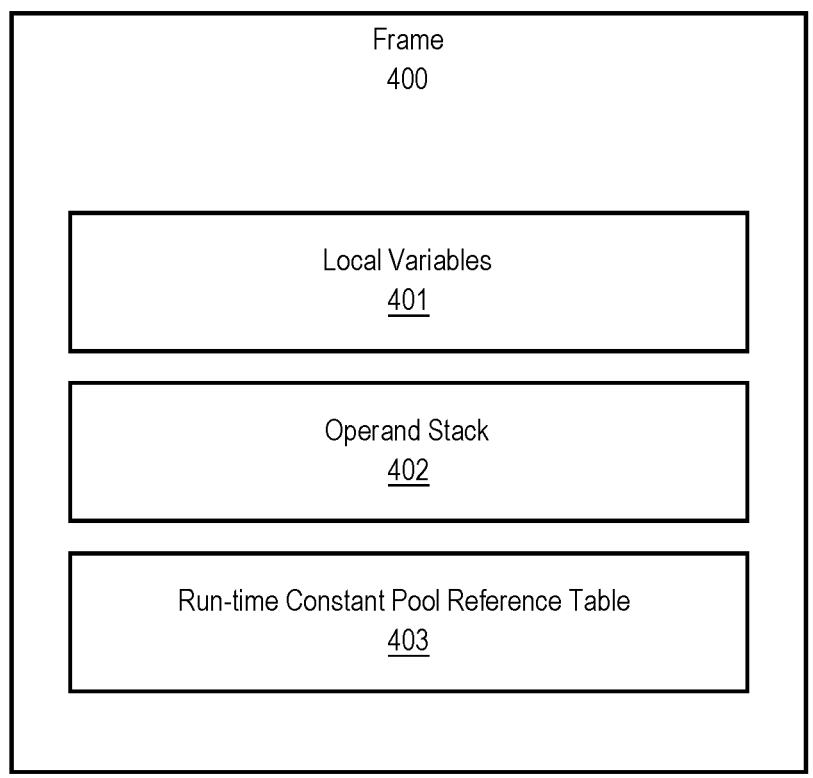
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Constant Propagation and Constant Folding

As noted above, constant propagation and folding are compile-time processes that help optimize compiled code and thereby reduce the amount of processing needed at runtime. In constant propagation, the compiler identifies expressions that have constant values and substitutes (or "propagates") the constant values in place of those expressions. For example, consider the following example of source code instructions:

```
int mass = 10;
int acceleration = 5;
int force = mass * acceleration;
```

In the example above, applying constant propagation results in replacing the references to the variables "mass" and "acceleration" with their corresponding constant values:

```
int mass = 10;
int acceleration = 5;
int force = 10 * 5;
```

In constant folding, the compiler identifies an expression that requires evaluation but resolves as a constant, i.e., that returns a constant value given constant input. The compiler evaluates the expression to obtain the constant value and replaces the expression with the constant value. After constant folding, it is no longer necessary for the compiler to generate code to evaluate the expression at runtime. Depending on the particular compiler and runtime environment, generating code to load the constant value into memory at runtime may be sufficient. The compiler may also propagate the constant value resulting from constant folding, further improving the efficiency of the compiled code. Alternatively or in addition, the compiler may apply a form of constant folding called "constant tracking," discussed in further detail below. In constant tracking, the compiler does not replace expressions with constant values, but keeps a record (by decorating an abstract syntax tree and/or maintaining a separate data structure) of the constant values associated with particular expressions.

In the example above, applying constant folding results in elimination of the multiplication expression:

```
int mass = 10;
int acceleration = 5;
int force = 50;
```

To apply constant folding to an expression, a compiler must be able to determine that the expression resolves as a constant. The determination of whether an expression resolves as a constant may depend on various factors. The compiler may be configured to resolve expressions as constants only if they return certain types that the compiler recognizes as potentially having constant values. These types may be referred to as "native" constant types, because they are built into (i.e., "native" to) the programming language specification and the compiler is configured to recognize them as potentially having constant values.

Examples of native constant types may include, for example, arithmetic types such as "int" or "float," character strings, and/or other constant types that may be native to the programming language specification and recognizable by the compiler as potentially having constant values.

The type returned by an expression may not be sufficient to determine whether the expression resolves as a constant. For example, an expression that returns an "int" may involve operations that cause the expression to return a value that varies depending on runtime state data. Because the value returned by the expression may vary at runtime, the expression cannot be resolved as a constant at compile time. A programming language specification may include a limited set of expressions that the compiler is configured to recognize as resolving as constants when certain conditions are satisfied. These expressions may be referred to as "native" constant expressions, because they are built into (i.e., "native" to) the programming language specification and the compiler is capable of determining, without any assistance from a user writing the source code expressions, whether the expressions resolve as constants. In particular, the compiler may be configured to recognize a limited set of built-in expressions as being resolvable as constants whenever only constant inputs are supplied to those expresssions.

For example, consider a multiplication expression ("x*y"). If "x" and "y" both are resolvable as constants, then the compiler may resolve the multiplication expression itself as a constant. However, if either "x" or "y" is not resolvable as a constant, or if the compiler is unable to determine whether "x" or "y" is resolvable as a constant, then the compiler may not resolve the multiplication expression as a constant. Consider the following example:

```
int i = 5 * 10;
int j = 7 * i;
int m = myMethod(j);
```

In this example, "int" is recognized by the compiler as a native constant type. Further, the multiplication expression assigned to "i" receives only native constants as inputs: the numbers 5 and 10. Thus, the compiler evaluates the expression to obtain a constant value of 50 for "i." The compiler then propagates the constant value to any subsequent references to the variable "i." The multiplication expression assigned to "j" also receives only native constants as inputs: the numbers 7 and 50 (the latter being the propagated constant value of "i"). Thus, the compiler evaluates the expression to obtain a constant value of 350 for "j." The compiler then propagates the constant value to any subsequent references to the variable "j."

However, continuing with the example above, the call to myMethod( ) is not a native constant expression. The compiler is not configured to determine whether the method call is resolvable as a constant, even though it receives only a native constant as input (i.e., the propagated constant value of "j") and returns a native constant type (i.e., "int"). Specifically, the compiler is not configured to know whether the method call will return a constant value given constant input. The return value of the method call may depend, for example, on state data that varies at runtime. Alternatively, the method call may indeed return a constant value given constant input. However, regardless of whether the method call actually returns a constant value, the compiler generates compiled instructions that result in the method call being executed at runtime.

In an embodiment, constant folding and/or propagation are performed subsequent to the compiler parsing the source code. A component of the compiler, referred to as a "parser," reads the source code and produces an abstract syntax tree ("AST") that represents the source code. An AST may include nodes that represent expressions and/or sub-expressions thereof, operands, values, etc. As discussed below, a programmer may supply, in the source code, a programming signal (also referred to herein as a command to the compiler) indicating that an expression evaluates as a constant value. The corresponding AST may represent the programming signal as a node, field, metadata, and/or some other type of indicator to the compiler to treat that expression as a constant value. The compiler performs a process called "type attribution," in which the compiler determines which nodes correspond to constant values. The compiler performs constant folding and propagation based on those types.

FIGS. 5A-5D illustrate examples of AST's in accordance with one or more embodiments. The illustrations in FIGS. 5A-5D are provided for exemplary purposes only and should not be construed as limiting one or more embodiments. In FIG. 5A, an example of an AST 500 represents the expression "a=2+3". The sum "2+3" resolves as the constant value "5." However, in FIG. 5A, no constant folding or propagation have been applied to the AST 500. In FIG. 5B, the compiler has evaluated the expression "2+3." The compiler has applied constant folding and propagation to the AST 500, so that the node "a" is associated directly (via another node, a field, metadata, or some other kind of association) with the constant value "5." The compiler has removed the nodes corresponding to operands and elements of the constant expression.

FIG. 5C illustrates an example of a form of constant folding called "constant tracking." In constant tracking, the compiler does not remove the nodes corresponding to operands and elements of the constant expression. Instead, for each node in the AST 500 that is associated with a constant value, the compiler "decorates" the node with that value. The compiler may decorate the node by adding a field to the node with the value of the constant, adding metadata to the node with the value of the constant, or taking some other action to associate the node with the constant value. In this example, the compiler has decorated the nodes corresponding to the variable "a" and the "+" operand with the constant value of "5." In addition, the compiler has decorated the nodes corresponding to the values "2" and "3," indicating that those nodes correspond to constant values. FIG. 5D illustrates another example of constant tracking. Instead of decorating the AST 500, the compiler uses a data structure 502 to record constant values associated with the corresponding nodes. The data structure 502 may be a lookup table, for example.

4. Compiling Non-Native Constants

Figure 6:
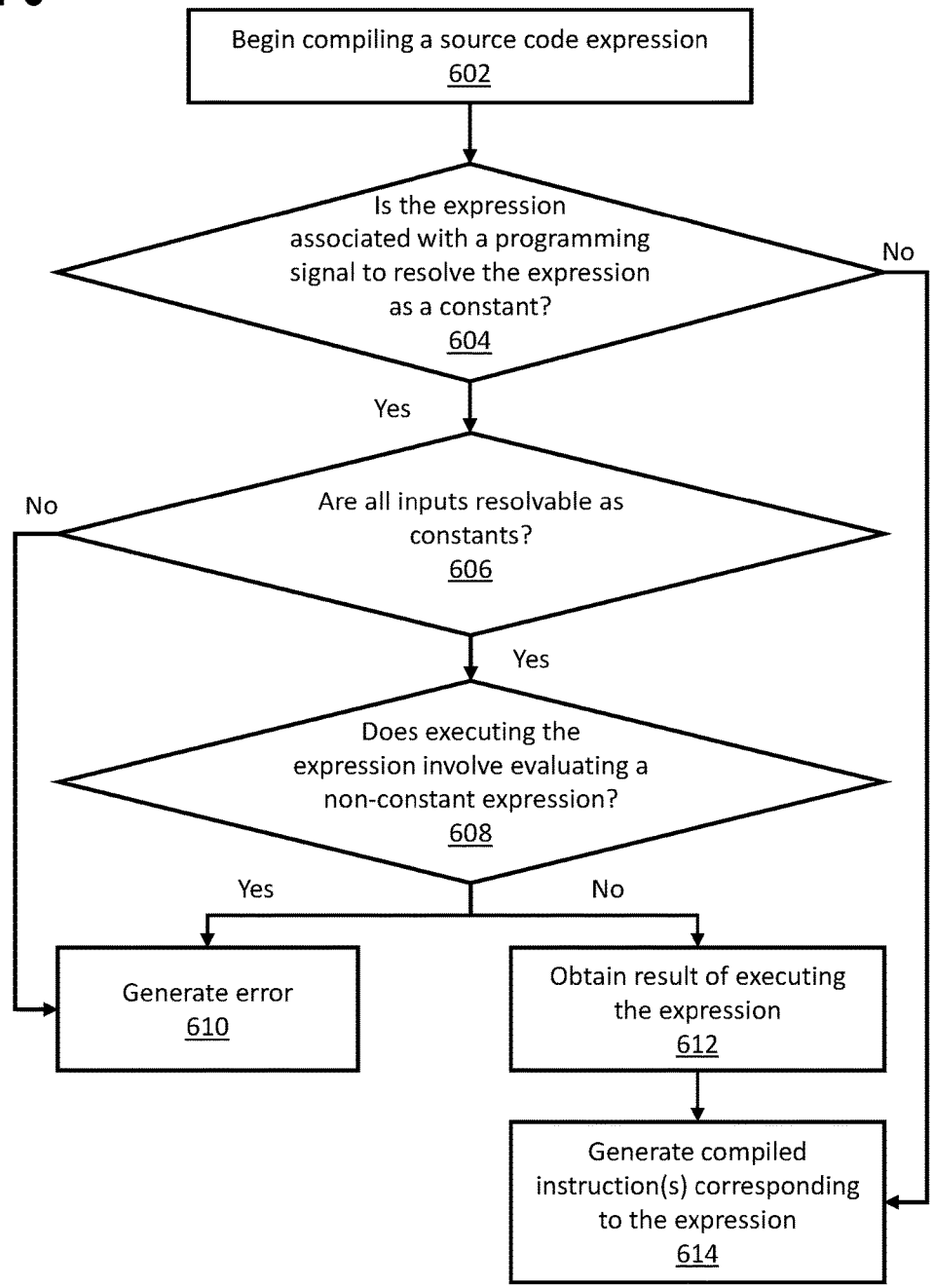
FIG. 6 illustrates a set of operations for compiling non-native constants in accordance with one or more embodiments.

FIG. 6 illustrates an example set of operations for compiling non-native constants in accordance with one or more embodiments. One or more operations illustrated in FIG. 6 may be modified, rearranged, or omitted all together. Accordingly, the particular sequence of operations illustrated in FIG. 6 should not be construed as limiting the scope of one or more embodiments.

In an embodiment, a compiler begins compiling a source code expression (Operation 602). The source code expression is part of source code instructions forming a particular unit of source code. For example, the source code expression may be part of a method, class, package, module, or any other type of source code unit. The source code instructions are written according to a specification directed to the convenience of a programmer. In an embodiment, the source code expression that the compiler begins compiling in Operation 602 is a method call. Alternatively, the source code expression may be any other type of expression. Alternatively or in addition, the source code expression may correspond to an expression embedded or nested in another source code expression. For example, the source code expression may be a method call supplied as an argument to another method call.

In an embodiment, while compiling the source code expression, the compiler determines whether the source code expression is associated with a programming signal to resolve the expression as a constant (Operation 604). Specifically, the programming signal is included in the source code instructions by a user. The programming signal corresponds to a command, by the user to the compiler, to resolve the source code expression as a constant. The source code expression is not a native constant expression. Specifically, the programming language specification does not include that particular source code expression as a native constant expression. In the absence of the programming signal, the compiler is not configured to natively resolve the source code expression as a constant. The compiler may be configured to recognize some expressions as constant based on a static set of constant expressions that are stored for consumption by the compiler independently of any source code expressions being evaluated. However, the particular source code expression at issue is not within the static set of constant expressions maintained by the compiler. By associating the programming signal with the source code expression, the user effectively commands the compiler to resolve the source code expression as a non-native constant.

The programming signal may take many different forms. The programming signal may be part of the same source code instruction as the source code expression being compiled or may be part of a different source code instruction. The programming signal may be an annotation, an indication that a class referenced by the source code expression implements a particular interface, a command line argument, a comment, a table in a text file associated with the source code, or any other type of programming signal or combination thereof.

In an embodiment, the programming signal has multiple parts. For example, if the source code expression is a method call, the programming signal may include (a) an indication that a class in which the method is located implements a particular interface for defining non-native constants, and (b) an annotation of the method signature. The annotation indicates that the method, when called, returns a constant value when given constant inputs. For ease of discussion, an interface for defining non-native constants is referred to hereinafter as a "Constable interface." For example, a class header may include the words "implements Constable" as a programming signal, indicating that the class is being used to define one or more non-native constants. Embodiments should not be considered limited to using a Constable interface. As another example, within a class, a particular method that is resolvable as a constant may include the annotation "@Foldable."

In an embodiment, if the source code expression is not associated with a programming signal to resolve the expression as a constant (e.g., as discussed with respect to Operation 604, above), the compiler resolves the source code expression as a non-constant. Specifically, when the compiler generates one or more compiled instructions corresponding to the source code expression (Operation 614), the instructions are for evaluating the source code expression at runtime.

In an embodiment, if the source code expression is associated with a programming signal to resolve the expression as a constant (e.g., as discussed with respect to Operation 604, above), the compiler determines whether all inputs to the source code expression are resolvable as constants (Operation 606). An input may not be resolvable as a constant, for example, if it is not a native constant expression, is not of a native constant type, and is not resolvable as a non-native constant. The compiler may be configured to resolve the source code expression as a constant only if all inputs to the source code expression also are resolvable as constants.

In an embodiment, if one or more inputs to the source code expression are not resolvable as constants, the compiler generates an error (Operation 610). Generating an error may involve terminating the compilation and outputting an error message to a user interface. The error message may indicate, for example, that the compiling was terminated because the source code expression received non-constant input. Alternatively, compiling may continue and the error may be considered a warning rather than a condition for terminating. If compiling continues, the compiler may not resolve the source code expression as a constant. Instead, the compiler may compile the source code expression so that it is evaluated at runtime (e.g., as discussed below with respect to Operation 614). Alternatively, the compiler may evaluate the non-constant input at compile time and resolve the source code expression as a constant using the compile-time value of the non-constant input. In other words, the non-constant input may be treated as a constant for purposes of resolving the source code expression as a constant, even though the input might have had a different value at runtime. For example, if the input includes a call to a getDate( ) method, the compiler may obtain a value from the getDate( ) method, corresponding to the date at compile time, and use that value to evaluate the source code expression. In an embodiment, a programmer may supply a signal indicating that an expression should be treated as a compile-time constant, i.e., using the resolved value at compile-time, even if the expression might have resolved as a different value at a different time (e.g., at runtime).

In an embodiment, the compiler determines whether executing the source code expression involves evaluating a non-constant expression (Operation 608). For example, if the source code expression is a method call, the method itself may include one or more source code expressions that are not resolvable as constants. In that case, the source code expression may not reliably return a constant value given constant input, contrary to what the programming signal indicates. Alternatively, the compiler may not determine whether executing the source code expression involves evaluating a non-constant expression. Instead, the compiler may assume that when a user includes the programming signal to resolve the source code expression as a constant, it is the user's responsibility to also ensure that the source code expression returns a constant value given constant input.

In an embodiment, if executing the source code expression does not involve evaluating a non-constant expression, or if no such determination is made, the compiler obtains the result of executing the source code expression (Operation 612), i.e., evaluates the source code expression. For a source code expression that is associated with a programming signal as discussed above, the result of executing the source code expression may be assumed to be a constant value when the source code expression is given constant input. Depending on the compiler, to execute the source code expression, the compiler may perform multiple steps necessary to generate compiled code based on the source code expression. The compiler may then execute (using a runtime environment) the compiled code to effectively evaluate the source code expression. In general, throughout this discussion, it should be understood that executing a source code expression may involve first generating compiled code based on the source code expression.

In an embodiment, the compiler compiles one or more instruction(s) corresponding to the source code expression (Operation 614). If a result of executing the source code expression was obtained (i.e., Operation 612), corresponding to a constant value of the source code expression, then the compiled instruction(s) may include one or more instructions for writing the constant value to a constant pool. The constant value may subsequently be folded and/or propagated. For example, techniques described herein for folding and/or propagating constants may be used.

In an embodiment, a source code expression resolved as a constant is associated with one or more source code instructions that specify how the constant value is written in the compiled instructions. For example, the source code expression may be associated with source code instructions that specify how the constant value is written to a constant pool. If the source code expression references a method of a class that implements a Constable interface, the Constable interface may supply a method, referred to here as "WritePool," for writing the constant value to the constant pool. The class may use a default version of WritePool or, alternatively, may override WritePool for more control over how the constant value is written to the constant pool.

In an embodiment, if a result of executing the source code expression was not obtained, and compiling was not terminated due to an error condition, then the compiler may compile the source code expression so that it is evaluated at runtime.

In general, in an embodiment, the method described above allows for extending the types of expressions that are resolvable as constants by a compiler, without having to rebuild the compiler to include and recognize those expressions as native constant expressions. Supporting non-native constants avoids potential complications that may arise from rebuilding a compiler. For example, rebuilding a compiler may be time-intensive, error-prone, and/or run the risk of having inconsistent compiler versions among members of a development team.

In the discussion above, it is assumed that the compiler does not resolve an expression as a constant unless (a) it is a native constant expression or (b) a programming signal indicates that it is a non-native constant expression. This model may be thought of as a "variable-by-default" model, where the word "variable" refers to values that are assumed to be non-constant. Alternatively, the compiler may assume that all expressions resolve as constants, unless a user includes a programming signal indicating that a particular expression does not resolve as a constant, i.e., that the expression does not return a constant value given constant input. This model may be thought of as a "constant-by-default" model. The discussion herein may apply, mutatis mutandis, to a constant-by-default model. In particular, in a constant-by-default model, a compiler may not determine whether a source code expression is associated with a programming signal to resolve the expression as a constant (Operation 604 in FIG. 6 above). Instead, a compiler may determine whether the source code expression is associated with a programming signal to resolve the expression as a variable that requires evaluation when it is invoked at runtime.

5. Propagating Non-Native Constants

Figure 7:
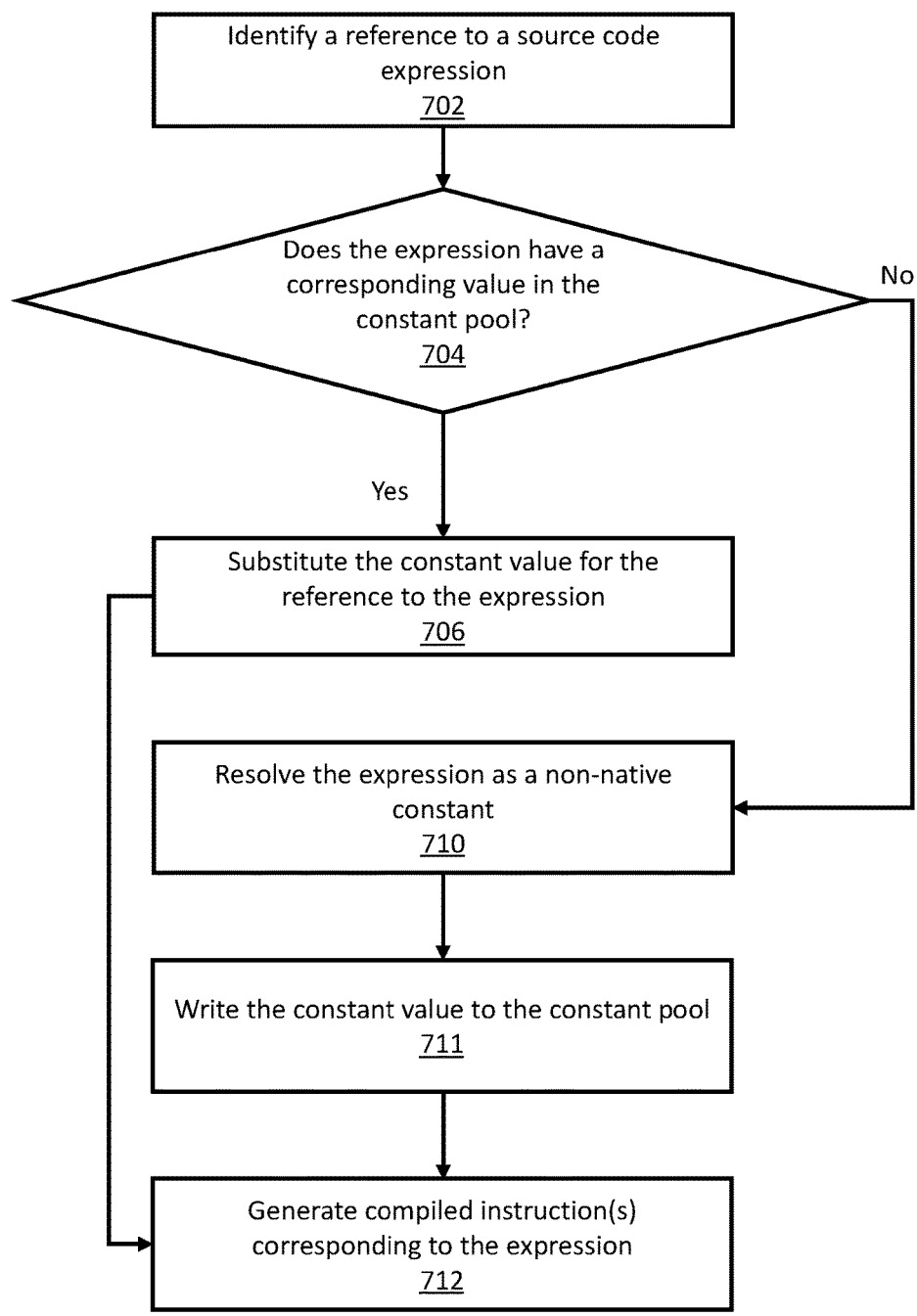
FIG. 7 illustrates a set of operations for propagating non-native constants in accordance with one or more embodiments.

As discussed above, a compiler may propagate and/or fold the constant value of a source code expression that is resolved as a constant. FIG. 7 illustrates an example set of operations for propagating non-native constants in accordance with one or more embodiments. One or more operations illustrated in FIG. 7 may be modified, rearranged, or omitted all together. Accordingly, the particular sequence of operations illustrated in FIG. 7 should not be construed as limiting the scope of one or more embodiments.

In an embodiment, a compiler identifies a reference to a source code expression (Operation 702). Specifically, the compiler identifies that the source code expression is resolvable as a non-native constant, using techniques described herein.

In an embodiment, the compiler determines whether the source code expression has a corresponding value in the constant pool (Operation 704). A value in the constant pool indicates that the compiler has already evaluated the source code expression to obtain the constant value. If the source code expression has a corresponding value in the constant pool, the compiler substitutes the constant value for the reference to the source code expression (Operation 706). The compiler generates one or more compiled instructions corresponding to the source code expression (Operation 712). The compiler may write the constant value of the source code expression directly into the compiled instructions. Alternatively, the compiler may write one or more compiled instructions to retrieve the constant value from the constant pool. The source code expression may be associated with one or more source code instructions for writing the corresponding compiled instruction(s), as described above.

In an embodiment, if the source code expression does not have a corresponding value in the constant pool, the compiler resolves the source code expression as a non-native constant (Operation 710). Resolving the source code expression as a non-native constant may be performed using operations described above. In an embodiment, the compiler writes the constant value to the constant pool (Operation 711). The source code expression may be associated with one or more source code instructions for writing the constant value to the constant pool, as described above. The compiler generates one or more compiled instructions corresponding to the source code expression (Operation 712), as described above.

6. Compiling Dynamic Method Invocations

Resolving non-native constants may be used in many different ways. For example, resolving non-native constants may be used to support dynamic method invocations. In dynamically typed programming languages, type-checking is handled at runtime. Software designed in a dynamically typed programming language may add a method to a class at runtime, as long as the method satisfies type-checking when it is invoked (i.e., dynamic method invocation). In statically typed programming languages, type-checking is handled at compile-time. Software designed in a statically typed programming language may not add a method to a class at runtime. However, techniques for compiling non-native constants, discussed herein, may allow for dynamic method invocations even in a statically typed programming language. Specifically, metadata associated with dynamic method calls may be modeled using non-native constants. Depending on the programming language and the type of dynamic method calls being modeled, such metadata may include, for example: a method type; a method handle; a method specifier; and/or any other constants that are needed for dynamic method invocation but not recognized as native constants.

Figure 8:
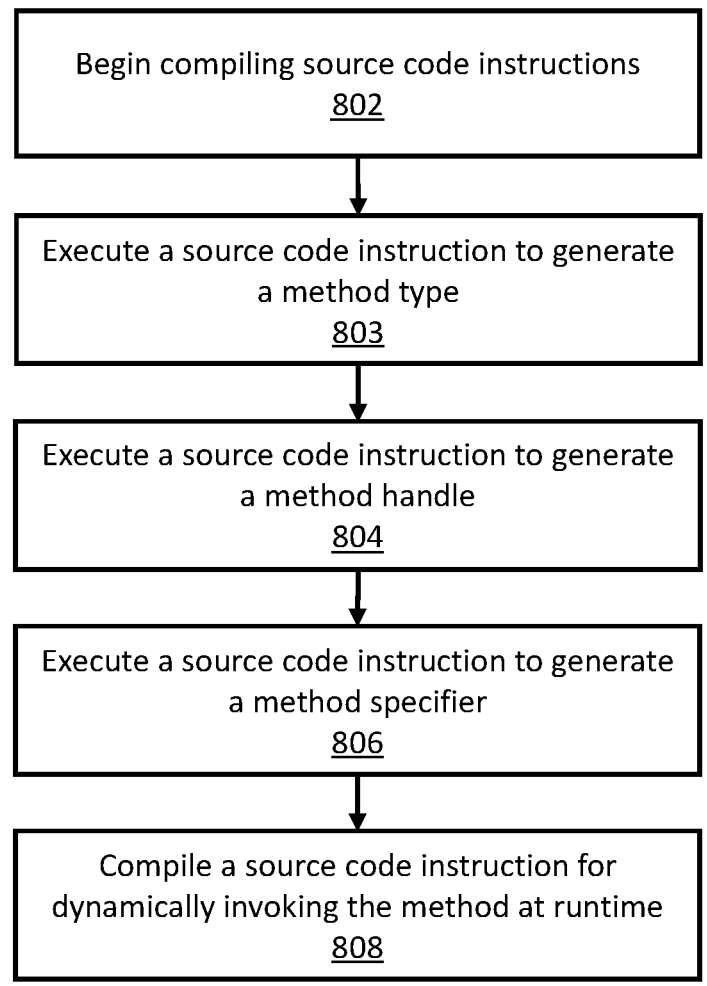
FIG. 8 illustrates a set of operations for compiling dynamic method invocations in accordance with one or more embodiments.

FIG. 8 illustrates an example set of operations for compiling dynamic method invocations in accordance with one or more embodiments. One or more operations illustrated in FIG. 7 may be modified, rearranged, or omitted all together. Accordingly, the particular sequence of operations illustrated in FIG. 8 should not be construed as limiting the scope of one or more embodiments.

In an embodiment, a compiler begins compiling source code instructions (Operation 802). The source code instructions may be in a statically typed programming language. While compiling the source code instructions, the compiler encounters a source code expression (referred to here, for ease of discussion, as the "first" source code expression) for generating a method type. The compiler executes the first source code expression to generate the method type (Operation 803). In an embodiment, a method type is an object or other type of code representing the arguments accepted by a particular method and/or the return type of the method. A method type may be used with a method handle, as described below, to support dynamic method invocation. In an embodiment, the compiler resolves the first source code expression as a non-native constant, using techniques described herein. The constant value of the method type may subsequently be folded and/or propagated.

In an embodiment, the compiler encounters another source code expression (referred to here, for ease of discussion, as the "second" source code expression) for generating a method handle. The compiler executes the second source code expression to generate the method handle (Operation 804). In an embodiment, a method handle is an object or other type of code referencing a particular method. The particular method is identified at the time the method handle is generated. The method handle may also be generated using a method type (e.g., a method type as generated in Operation 803, above). In contrast to the typical approach of invoking methods by calling them directly, the method handle allows the method to be accessed via the reference, which can be passed as an argument or input to other expressions and invoked at a later time. In an embodiment, the compiler resolves the second source code expression as a non-native constant, using techniques described herein. The constant value of the method handle may subsequently be folded and/or propagated.

In an embodiment, the compiler encounters another source code expression (referred to here, for ease of discussion, as the "third" source code expression) for generating a method specifier. The compiler executes the third source code expression to generate the method specifier (Operation 806). In an embodiment, a method specifier is generated based on a method handle, referencing a method (e.g., a method handle as generated in Operation 804, above). The method specifier may also be generated using one or more arguments to be supplied as input to the method when the method is invoked. The method specifier is an object or other type of code that includes instructions for invoking the method identified by the method handle, using the provided arguments, if any. The method itself is not invoked at the time the method specifier is generated. In an embodiment, the compiler resolves the third source code expression as a non-native constant, using techniques described herein. The constant value of the method specifier may subsequently be folded and/or propagated.

In an embodiment, the compiler encounters another source code expression (referred to here, for ease of discussion, as the "fourth" source code expression) for dynamically invoking the method at runtime. The source code expression may indicate dynamic (i.e., non-constant) arguments to be supplied to the method at runtime, which cannot be resolved as constant values. The fourth source code expression may not be resolvable as a constant, but may take, as input, a method specifier and/or method handle. The compiler compiles the fourth source code instruction (Operation 808). In an embodiment, the compiled instructions corresponding to the fourth source code instruction allow for the method to be invoked dynamically, at runtime. For example, in Java bytecode, the compiler may write an INVOKEDYNAMIC bytecode instruction.

In an embodiment, operations discussed above may facilitate the inclusion of dynamic method invocation in programming languages where dynamic method invocation is otherwise unavailable or cumbersome. For example, Java is a statically typed programming language. However, a developer may wish to implement a dynamically typed programming language running on a Java Virtual Machine. An embodiment of the method described above may allow the developer to use Java source code to instruct the Java Virtual Machine compiler to write dynamic method invocations to bytecode. An ability to express dynamic method invocations in source code may reduce or eliminate the need for the developer (i.e., the developer of the dynamically typed programming language implementation) to write dynamic method invocations directly in bytecode. Alternatively or in addition, an ability to express dynamic method invocations in source code may allow the developer to test an implementation of a dynamically typed programming language without needing to write the test(s) directly in bytecode.

As an example, consider the following source code, where the numbers on the left correspond to line numbers for ease of reference. This source code is provided by way of example only, and embodiments should not be considered limited to the specific instructions, expressions, and/or general programming syntax shown here.

```
1   MethodTypeConstant methodTypeForMethodHandle = MethodTypeConstant.of(
        ClassConstant.of("Ljava/lang/invoke/Callsite;"),
        ClassConstant.of("Ljava/lang/invoke/MethodHandles$Lookup:),
        ClassConstant.of("Ljava/lang/String;"),
        ClassConstant.of("Ljava/lang/invoke/MethodType;"),
        ClassConstant.of("Ljava/lang/String;"),
        ClassConstant.of("Ljava/lang/Object;"));
2   MethodHandleConstant mh =
    MethodHandleConstant.ofStatic(ClassConstant.of("Ljava/lang/invoke/StringConcatFactory;"),
    "makeConcatWithConstants", methodTypeForMethodHandle);
3   final String param = "" + '\u0001' + '\u0001';
4   BootstrapSpecifier indyDescr = BootstrapSpecifier.of(mh,param);
5   return (String) invokedynamic(indyDescr, "makeConcatWithConstants", x, y);
```

In the example above, line 1 includes an expression to generate a method type. Specifically, the expression to the right of the equals sign calls a factory method ("of") of the class MethodTypeConstant, to generate an object of type MethodTypeConstant named methodTypeForMethodHandle. While not shown here, the class MethodTypeConstant implements a Constable interface, and its "of" method is annoted as "@Foldable." In addition, the class ClassConstant implements a Constable interface, and its "of" method is annoted as "@Foldable." Thus, every input to the call to "MethodTypeConstant.of" resolves as a constant, and the call to "MethodTypeConstant.of" itself resolves as a constant. These are non-native constants, because without the annotations, the compiler would not know that they return constant values given constant inputs. Because the expression resolves as a non-native constant, the constant value returned by the expression can be propagated to subsequent references to the variable methodTypeForMethodHandle.

Continuing with the example above, line 2 includes an expression to generate a method handler. Specifically, the expression to the right of the equals sign calls a factory method ("ofStatic") of the class MethodHandleConstant to generate an object of type MethodHandleConstant named mh. As noted above, the class ClassConstant resolves as a non-native constant. The string "makeConcatWithConstants" is a constant string literal, and the variable methodTypeForMethodHandle has a propagated constant value, as discussed above. Thus, every input to the call to "MethodHandleConstant.ofStatic" resolves as a constant. While not shown here, the class MethodHandleConstant implements a Constable interface, and its "ofStatic" method is annotated as "@Foldable." Therefore, the call to "MethodHandleConstant.ofStatic" itself resolves as a constant. Accordingly, the constant value returned by the expression can be propagated to subsequent references to the variable mh.

Continuing with the example above, in line 3, a String object named param is initialized with the value to the right of the equals sign. String is a native constant type, and concatenation using the "+" operator is a native constant expression. Thus, applying constant folding to the concatenation expression, having only string literals as input, results in param resolving as a constant. The constant string value can be propagated to subsequent references to the variable param.

Continuing with the example above, line 4 includes an expression to generate a method specifier. Specifically, the expression to the right of the equals sign calls a factory method ("of") of the class BootstrapSpecifier to generate an object of type BootstrapSpecifier named indyDescr. As noted above, the variables bh and param both have constant values, which are propagated to line 4. While not shown here, the class BootstrapSpecifier implements a Constable interface, and its "of" method is annotated as "@Foldable." Therefore, the call to "BootstrapSpecifier.of" itself resolves as a constant. Accordingly, the constant value returned by the expression can be propagated to subsequent references to the variable indyDescr.

Continuing with the example above, line 5 includes an expression to dynamically invoke the method, given the method specifier (indyDescr), the name of the method, and two additional inputs x and y, whose values are not shown here. When invoked, the method will return a concatenation of x and y, formatted as specified in the variable param. When the compiler encounters this expression, it writes an INVOKEDYNAMIC instruction to bytecode, allowing the method to be invoked dynamically at runtime. INVOKEDYNAMIC is an intrinsic function, i.e., a function that is built into the Java compiler and optimized for handling by the compiler. In the process described above, the compiler effectively translates source code, corresponding to non-native constants, into the optimized INVOKEDYNAMIC intrinsic function. This process may be referred to as "intrinsification."

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 9:
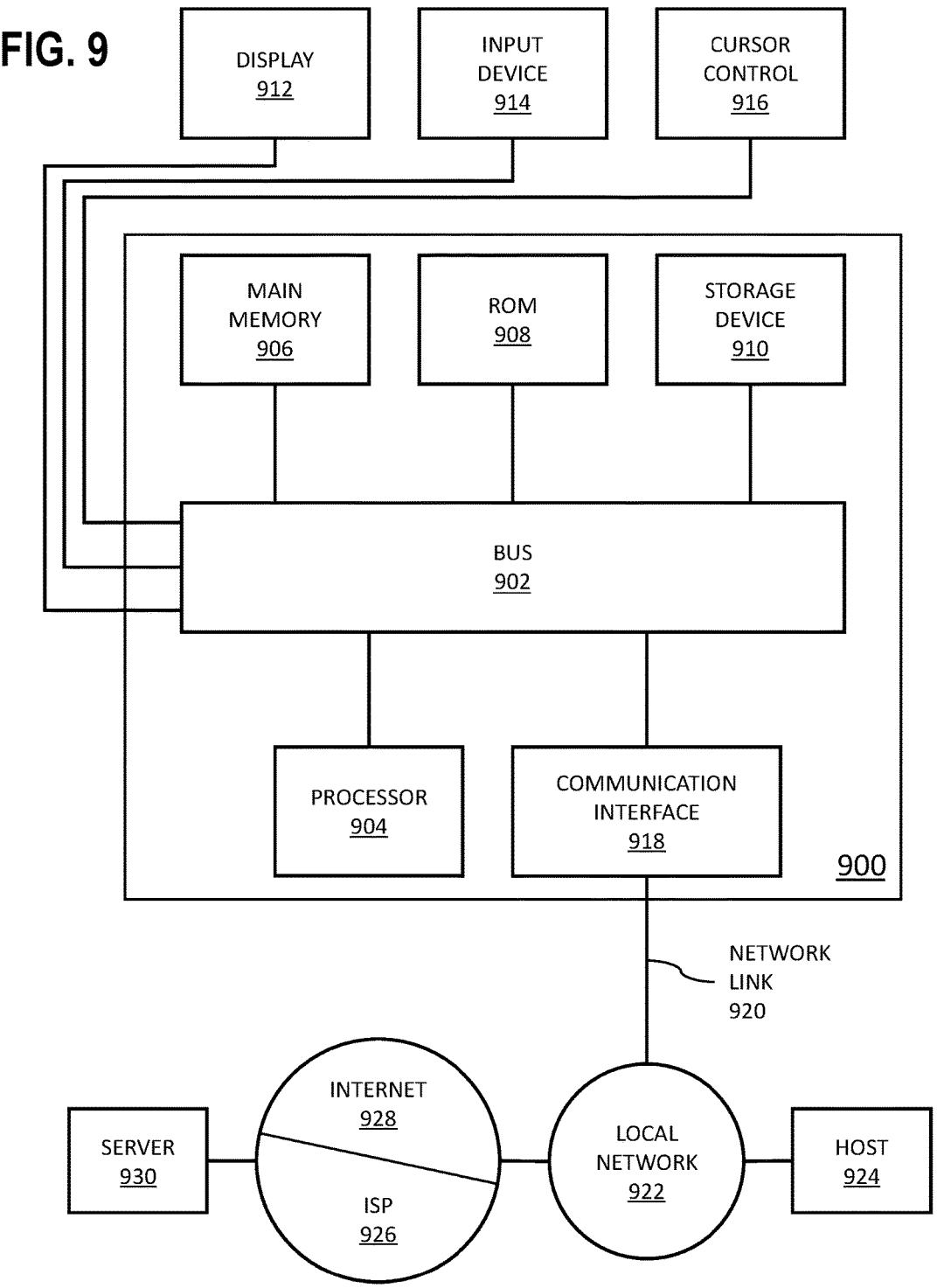
FIG. 9 shows a block diagram that illustrates a computer system in accordance with one or more embodiments.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

9. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

10. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
    determining, by a compiler, that a first source code expression in a plurality of source code instructions is associated with a first command to the compiler to resolve the first source code expression as a first non-native constant during compilation of the plurality of source code instructions, wherein the compiler is not configured to recognize the first source code expression as constant without the first command signaling to the compiler that the first source code expression is constant;
    executing, by the compiler, the first source code expression based on the first command to obtain a first constant value for the first non-native constant;
    generating, by the compiler, one or more compiled instructions at least by substituting the first constant value for at least one reference to the first source code expression;
    determining, by the compiler, that a second source code expression in the plurality of source code instructions is associated with a second command to the compiler to resolve the second source code expression as a second non-native constant during compilation of the plurality of source code instructions, wherein the compiler is not configured to recognize the second source code expression as constant without the second command signaling to the compiler that the second source code expression is constant;
    attempting to execute, by the compiler, the second source code expression based on the second command to obtain a second constant value for the second non-native constant; and
    while attempting to execute the second source code expression:
        determining that the second source code expression is not resolvable as the second non-native constant,
        wherein determining that the second source code expression is not resolvable as the second non-native constant comprises identifying a non-constant input to the second source code expression, and
        generating an error based on determining that the second source code expression is not resolvable as the second non-native constant.

2. The one or more media of claim 1, wherein the first source code expression comprises a call to a method, and wherein the first command to the compiler comprises a method modifier indicating that the method is a pure function of one or more inputs.

3. The one or more media of claim 1, wherein the first command to the compiler indicates that the first source code expression is implemented using a programming interface for defining constants.

4. The one or more media of claim 1, further storing instructions which, when executed by one or more processors, cause:
    reducing, by the compiler, a third source code expression to a third constant value, the third source code expression comprising a particular reference to the first source code expression and a reference to at least one other constant.

5. The one or more media of claim 1, wherein the first source code expression comprises a call to a factory method for generating method handles, and wherein the first constant value comprises a method handle.

6. The one or more media of claim 1, wherein the compiler is a virtual machine compiler configured to compile instructions that are executable by a virtual machine.

7. The one or more media of claim 1, wherein the plurality of source code instructions comprises a source code instruction for writing the first constant value to compiled instructions.

8. A system comprising:
    at least one device including a hardware processor;
    the system being configured to perform operations comprising:
        determining, by a compiler, that a first source code expression in a plurality of source code instructions is associated with a first command to the compiler to resolve the first source code expression as a first non-native constant during compilation of the plurality of source code instructions, wherein the compiler is not configured to recognize the first source code expression as constant without the first command signaling to the compiler that the first source code expression is constant;
        executing, by the compiler, the first source code expression based on the first command to obtain a first constant value for the first non-native constant;
        generating, by the compiler, one or more compiled instructions at least by substituting the first constant value for at least one reference to the first source code expression;
        determining, by the compiler, that a second source code expression in the plurality of source code instructions is associated with a second command to the compiler to resolve the second source code expression as a second non-native constant during compilation of the plurality of source code instructions, wherein the compiler is not configured to recognize the second source code expression as constant without the second command signaling to the compiler that the second source code expression is constant;
        attempting to execute, by the compiler, the second source code expression based on the second command to obtain a second constant value for the second non-native constant; and
        while attempting to execute the second source code expression:

determining that the second source code expression is not resolvable as the second non-native constant, wherein determining that the second source code expression is not resolvable as the second non-native constant comprises identifying a non-constant input to the second source code expression, and generating an error based on determining that the second source code expression is not resolvable as the second non-native constant.

9. The system of claim 8, wherein the first source code expression comprises a call to a method, and wherein the first command comprises a method modifier indicating that the method is a pure function of one or more inputs.

10. The system of claim 8, wherein the first command indicates that the first source code expression is implemented using a programming interface for defining constants.

11. The system of claim 8, wherein the operations further comprise:

reducing, by the compiler, a third source code expression to a third constant value, the third source code expression comprising a particular reference to the first source code expression and a reference to at least one other constant.

12. The system of claim 8, wherein the first source code expression comprises a call to a factory method for generating method handles, and wherein the first constant value comprises a method handle.

13. The system of claim 8, wherein the compiler is a virtual machine compiler configured to compile instructions that are executable by a virtual machine.

14. The system of claim 8, wherein the plurality of source code instructions comprises a source code instruction for writing the first constant value to compiled instructions.

* * * * *

UNITED STATES PATENT AND TRADEMARK OFFICE
CERTIFICATE OF CORRECTION

Page 1 of 1

PATENT NO. : 10,303,449 B2
APPLICATION NO. : 15/908664
DATED : May 28, 2019
INVENTOR(S) : Goetz et al.

It is certified that error appears in the above-identified patent and that said Letters Patent is hereby corrected as shown below:

In the Drawings

On sheet 2 of 9, in FIG. 2, under Reference Numeral 200, Line 1, delete "Flle" and insert -- File --, therefor.

In the Specification

In Column 13, Line 25, delete "expresssions." and insert -- expressions. --, therefor.

In Column 21, Line 8, delete "annoted" and insert -- annotated --, therefor.

In Column 21, Line 10, delete "annoted" and insert -- annotated --, therefor.

Signed and Sealed this
Twenty-first Day of July, 2020

Andrei Iancu
*Director of the United States Patent and Trademark Office*